(12) United States Patent
Selchert et al.

(10) Patent No.: US 9,650,147 B2
(45) Date of Patent: May 16, 2017

(54) DEVICE AND METHOD FOR COOLING EXHAUST AIR OF AIRCRAFT AIR-CONDITIONING SYSTEMS

(75) Inventors: Thomas Selchert, Hamburg (DE); Alexander Solntsev, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 740 days.

(21) Appl. No.: 12/952,809

(22) Filed: Nov. 23, 2010

(65) Prior Publication Data

US 2011/0151763 A1 Jun. 23, 2011

Related U.S. Application Data

(63) Continuation of application No. PCT/EP2009/056144, filed on May 20, 2009.

(60) Provisional application No. 61/130,390, filed on May 30, 2008.

(30) Foreign Application Priority Data

May 30, 2008 (DE) .................. 10 2008 002 116

(51) Int. Cl.
*B64D 13/00* (2006.01)
(52) U.S. Cl.
CPC .................. *B64D 13/00* (2013.01)
(58) Field of Classification Search
USPC .......................................... 454/76
See application file for complete search history.

(56) References Cited

U.S. PATENT DOCUMENTS

| | | | |
|---|---|---|---|
| 2,767,561 A | 10/1956 | Seeger | |
| 4,307,743 A * | 12/1981 | Dunn | 137/15.1 |
| 4,937,431 A * | 6/1990 | Jameson et al. | 392/395 |
| 6,729,156 B2 | 5/2004 | Sauterleute et al. | |
| 2002/0152765 A1 | 10/2002 | Sauterleute et al. | |
| 2005/0194125 A1* | 9/2005 | Asai et al. | 165/202 |
| 2007/0117501 A1 | 5/2007 | Solntsev et al. | |
| 2009/0014593 A1* | 1/2009 | Westenberger et al. | 244/209 |
| 2010/0096118 A1* | 4/2010 | Scherer et al. | 165/253 |
| 2011/0111683 A1* | 5/2011 | Kelnhofer | 454/76 |

FOREIGN PATENT DOCUMENTS

| | | |
|---|---|---|
| CN | 1894130 A | 1/2007 |
| DE | 29 28 332 | 1/1981 |
| DE | 2928332 A1 * | 1/1981 |
| DE | 10119433 C1 | 8/2002 |

(Continued)

OTHER PUBLICATIONS

Abstract english translation of document DE2928332A1.*

(Continued)

*Primary Examiner* — Helena Kosanovic
(74) *Attorney, Agent, or Firm* — Jenkins, Wilson, Taylor & Hunt, P.A.

(57) ABSTRACT

Device for exhaust air cooling of aircraft air-conditioning systems comprising a bypass channel that bypasses an aircraft air-conditioning system arranged downstream of a ram air channel with a ram air inlet channel portion, and merges into an outlet channel, arranged downstream of the aircraft air-conditioning system, before a discharge opening for exhaust air, a common inlet being provided for the ram air channel and the bypass channel.

7 Claims, 5 Drawing Sheets

(56) References Cited

FOREIGN PATENT DOCUMENTS

| DE | 10244199 A1 | 4/2004 |
|----|----|----|
| DE | 10361657 A1 | 8/2005 |
| GB | 1 385 182 | 2/1975 |
| JP | 2007-516892 | 6/2007 |
| RU | 2111152 | 5/1998 |
| WO | WO 2005/063564 | 7/2005 |
| WO | WO 2005/063569 | 7/2005 |

OTHER PUBLICATIONS

German Office Action for DE 10 2008 002 116.4 dated Apr. 22, 2009.
International Search Report for PCT/EP2009/056144 dated Sep. 3, 2009.
Japanese Office Action for Application No. 2011-510951 dated Jul. 10, 2013.
Russian Decision to Grant for Application No. 2010147877/11 dated May 24, 2013.
Chinese Office Action for Application No. 200980119857.2 dated Nov. 5, 2012.
Chinese Notification to Grant for Application No. 2009801198572 dated May 27, 2014.

* cited by examiner

DEVICE AND METHOD FOR COOLING EXHAUST AIR OF AIRCRAFT AIR-CONDITIONING SYSTEMS

CROSS-REFERENCE TO RELATED APPLICATIONS

This application is a continuation of PCT/EP2009/056144 filed May 20, 2009 and claims the benefit of U.S. Provisional Application No. 61/130,390 filed May 30, 2008 and German patent application No. 10 2008 002 116.4-22, filed May 30, 2008, the entire disclosures of which are herein incorporated by reference.

FIELD OF THE INVENTION

The present invention relates to a device and method for the exhaust air cooling of aircraft air-conditioning systems.

BACKGROUND OF THE INVENTION

CFRP materials are increasingly used in new aircraft developments. In order to use them it is necessary to adapt external influencing factors, such as temperature and humidity, to the material-specific properties so the strength behaviour is only affected to a minimal extent.

Modern aircraft air-conditioning systems (fresh air supply systems) operate by the principle of single-stage compression by a compressor that is driven by an air turbine. The ram air is used to cool the hot and compressed engine bleed air through the external flow during flight and through a fan in the ram air channel at ground level. This air in turn drives the compressor via a turbine and is conditioned in accordance with the requirements in the cabin.

The purpose of the ram air channel of the fresh air supply system is to make the external air available as cooling air for the heat exchanger. The ram air channel generally consists of a NACA ram air inlet channel, a diffuser, a rubber hose connection, possibly a ram air channel plenum and a ram air outlet channel. The heat exchanger and the plenum of the fresh air supply system are installed between the ram air channel plenum and the ram air outlet channel with an ACM fan (ACM=air cycle machine (three-wheel turbomachine, i.e. turbine, compressor, fan)). The ACM fan and the compressor are driven by the expansion in a turbine. The ACM fan ensures that the cooling air is guided through the heat exchanger, even at ground level.

During flight the external flow arrives at the ram air channel via the ram air inlet channel, which is usually of NACA shape. Some of the dynamic portion of the total pressure is converted into the static portion in the diffuser (the flow decelerates). Static overpressure (relative to the ambient pressure) is thus produced and is also called ram pressure at the entrance to the heat exchanger. The circulation of cooling air is controlled by two movable, interconnected ram air inlet channel flaps. In this instance the front flap in the direction of flight is rigidly attached to the frame and is moved up/down at the end via a lever of a spindle. The second flap is connected to the first flap at the end of the first flap via a hinge. The upward/downward movement (i.e. the closing or opening of the ram air inlet) results in parallel displacement of the rear end of the second flap, said displacement being compensated for by a short pendulum rod.

The ram air outlet channel is generally equipped with only one flap. The opened ram air outlet channel flap generates a vacuum in the ram air outlet channel as a result of the circulation by external air. This vacuum affects the cooling mass flow through the heat exchanger. The flap is operated by an actuator.

In the method described the cold ram air that flows through the heat exchanger via the ram air inlet channel is heated to such an extent that the outlet exhaust air temperature can lie in the range up to 200° C. During flight this hot exhaust air may be applied to the surface of the aircraft by the effect of the external flow. Despite specific cooling by the external flow, the temperature can still be up to 160° C. when it reaches the aircraft CFRP structure. The strengths of current CFRP materials can still be quantitatively determined up to a temperature range of 100° C. to 120° C., depending on the load profile and ambient conditions. Loads above this temperature range may lead to irreversible material damage and therefore to breakdown.

A current solution for reducing the outlet temperature provides a 'cooling film' that, similarly to a cold air cushion, acts between the hot exhaust air and the surface of the aircraft, as described for example in DE 102 44 199 A1. The cooling film keeps the temperature of the surface of the aircraft below the critical temperature for CFRP. The cooling film is produced as a result of the pressure differential between the installation space for the aircraft air-conditioning system and the outside environment. A strong vacuum region is produced during flight at the surface of the aircraft in the region of the ram air channel owing to the position of the ram air outlet channel at the surface of the aircraft. The source of the cooling film is ventilation air that is made available from the separate ram air inlet. The cooling film is guided selectively beneath the exhaust air flow.

The main drawback of this principle is that when the cooling film fails, for example as a result of the impact of a foreign body or specific flight manoeuvres, the wing box may overheat in an unperceived manner since the aircraft air-conditioning system is still in operation. An electric shutdown function is problematic with regard to safety requirements.

The cooling air film also cannot be maintained during every flight phase. The wing flaps and/or spoilers/airbrakes are extended during the landing approach and during low-speed flight in such a way that the above-mentioned installation space for the aircraft air-conditioning system is connected to the outside environment. There is a stronger vacuum in the regions of the wing flaps and spoilers/airbrakes than in the region of the ram air outlet channel in such a way that the cooling air does not flow out through the slot for the cooling air film, but instead flows out in the region of the wing flaps and spoilers/airbrakes. The cooling film thus provides no protection against hot exhaust air during these flight phases. There is also no protection against hot exhaust air in the case of a fault, for example damage to the surface of the aircraft, which may lead to failure of the cooling air film.

One object of the present invention is therefore to provide a device and a method that make it possible to cool the hot exhaust air from a fresh air supply system as required in the ram air outlet channel, in such a way that the aircraft CFRP structure arranged behind the channel is subjected to low exhaust air temperatures.

Accordingly, a bypass channel that bypasses an aircraft air-conditioning system arranged downstream of a ram air channel with a ram air inlet channel portion, and merges into an outlet channel, arranged downstream of the aircraft air-conditioning system, before a discharge opening for exhaust air is provided in a device according to the invention for exhaust air cooling of aircraft air-conditioning systems, a common inlet being provided for the ram air channel and the bypass channel, is provided.

In the present invention the exhaust air is already cooled before exiting from the outlet via a ram air bypass channel to such an extent that the critical temperature for CFRP cannot be reached. If the ram air bypass channel fails, the aircraft air-conditioning system also fails or is switched off in such a way that a fault will not result in overheating of the CFRP aircraft structure. In this instance both the ram air channel and a variable bypass channel are supplied by a single air inlet.

The bypass channel is preferably connected as directly as possible to the aircraft air-conditioning system outlet channel in order to keep the pressure loss low. It preferably merges into the aircraft air-conditioning system outlet channel before the discharge of the exhaust air into the outside environment. The channel thus bypasses the aircraft air-conditioning system and feeds cold ram air into the hot exhaust air flow.

A common inlet is preferably provided for the ram air and the bypass channel. This has the advantage that the cooling film is always provided during operation of the aircraft air-conditioning system.

The variable permeability of the bypass channel is achieved by a bypass channel flap. In this constructional solution the parallel displacement of the second flap of the ram air inlet channel is utilised in order to adjust the inlet opening of the bypass channel. Instead of the pendulum rod, an inlet flap of the bypass channel assumes the function of the pendulum rod and simultaneously adjusts the opening cross-section of the bypass channel. The bypass channel is opened when the flaps of the ram air inlet channel are closed. The bypass channel is closed to a maximum when the flaps of the ram air inlet channel are arranged in the maximum ram air channel flap position for flight. The end of the second flap of the ram air inlet channel forms the removal point of cold air for the bypass channel.

The purely mechanical adjustment operates by the following principle. If a high cooling power of the aircraft air-conditioning system is required, the ram air inlet channel is opened to the maximum (flaps move downwards). For this cooling situation the maximum available ram air is required by the heat exchanger to cool down the bleed air. The design is configured in such a way that the opening of the bypass channel is closed as far as possible (flap of the bypass channel is closed, permeability of the bypass channel is low). Since in this instance the ram pressure in the ram air channel is high, the mass flow through the bypass channel will be sufficient to provide the protective function. In addition, a large cooling air mass flow is provided for this operating state and therefore the exhaust air temperature does not fall within the critical temperature range. A large bypass cooling flow is therefore also not necessary.

By comparison, minimal heat is to be emitted by the bleed air during heating. The ram air inlet channel is therefore moved to the minimum opening (flaps move upwards). In this instance the ram pressure in the ram air channel is low so the high permeability of the bypass channel is required in order to ensure a sufficient mass flow through the bypass channel. In this operating state the low volume of ram air is additionally well heated by the bleed air in such a way that the increased bypass cooling air flow is required. This design is configured in such a way that the opening of the bypass channel is opened as far as possible (permeability of the bypass channel is maximal).

The fan installed for ground operations scoops the ambient air toward the heat exchangers and generates a vacuum in the ram air inlet channel. Hot exhaust air can thus be supplied to the inlet via the bypass channel, as a result of which the exhaust air temperature can be heated up to the critical range. A non-return valve is thus provided for this situation.

The constructional integration of the bypass channel and of the ram air channel in an air inlet makes it possible to achieve a clear safety advantage over a separate bypass channel. If the NACA inlet becomes damaged; for example as a result of the impact of a bird, it is more likely that, in addition to the bypass channel, the aircraft air-conditioning system will simultaneously also no longer function. In this instance no more hot exhaust air will reach the aircraft structure. By comparison, with a separate bypass inlet the aircraft air-conditioning system would continue to operate via its own channel in such a way that the hot exhaust air can reach the aircraft structure unimpeded and damage the material thereof in a sustained manner. The purely mechanical construction offers greater reliability compared to electrical solutions (sensors, additional electrical flap control, etc.).

BRIEF DESCRIPTION OF THE DRAWINGS

In the following, the invention is described in greater detail on the basis of embodiments with reference to the following figures of the drawings, in which.

In the figures, like reference numerals denote like or functionally identical components, unless indicated otherwise.

DETAILED DESCRIPTION OF THE INVENTION

Figure 1:
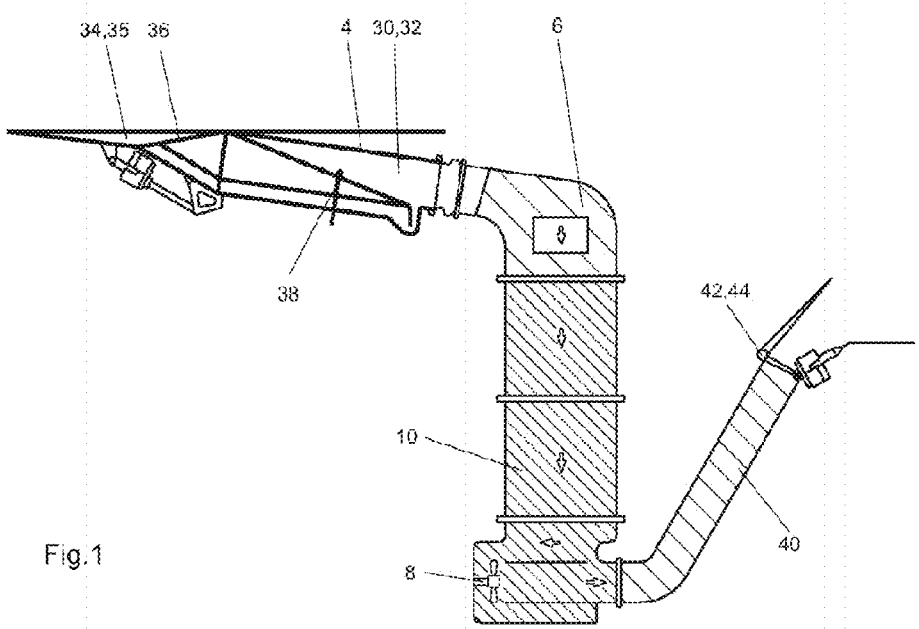
FIG. 1 is a schematic cross-sectional view of an air-conditioning system with a ram air channel.

FIG. 1 shows a schematic cross-sectional view of an air-conditioning system 10 with a ram air channel 30. An inlet opening 34 of a ram air inlet channel 32 is illustrated in the top left-hand corner in FIG. 1. The ram air inlet channel 32 leads to an air-conditioning system 10 via a diffuser 4 and a ram air channel plenum 6. A ram air outlet channel 40 is arranged downstream of the air-conditioning system 10, the discharge opening 42 of which channel is closed by a ram air channel outlet flap 44. The ram air channel 30 thus comprises a ram air inlet channel 32 and a ram air outlet channel 40. A fan 8 is arranged in the lower part of the air-conditioning system 10. An inlet cross-section 35 of the inlet opening 34 of the ram air inlet channel 32 is defined by a first flap 36 and a second flap 38.

During operation air is introduced into the ram air inlet channel 32 through the inlet opening 34 and is fed through said channel to the air-conditioning system 10 for heat exchange. Once the air has been guided through the air-conditioning system 10, it is released into the outside environment via the ram air outlet channel 40. The amount of air flowing into the ram air inlet channel 32 is varied as a result of the first flap 36 and the second flap 38 varying the inlet cross-section 35 of the ram air inlet channel 32. If the inlet cross-section 35 is enlarged then more air can flow into the ram air inlet channel 32. The air is then supplied via the diffuser 4 and the ram air channel plenum 6 to the air-conditioning system 10, where heat is exchanged. After passing through the air-conditioning system the air flows through the ram air outlet channel 40 and into the outside environment. The fan 8 arranged downstream of the air-conditioning system 10 assists the flow of air through the ram air channel 30 when the inlet opening 34 is subject to only a weak flow, for example as is the case when the aircraft is on the ground. The flow of air out from the ram air outlet channel 40 can be adjusted using the ram air channel outlet flap 44.

Figure 2:
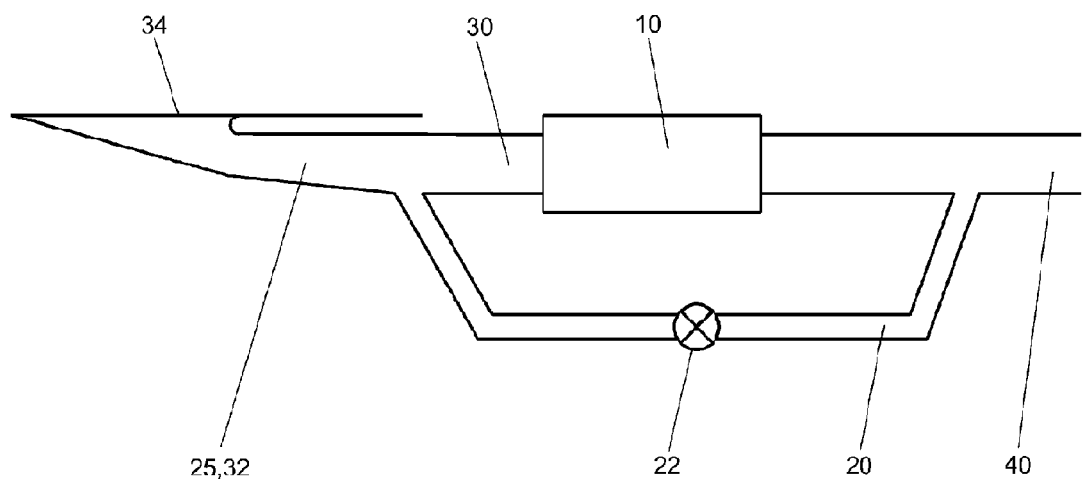
FIG. 2 is a schematic cross-sectional view of the arrangement of a bypass channel alongside a ram air channel.

FIG. 2 shows a schematic cross-sectional view of the arrangement of a bypass channel 20 alongside a ram air channel 30. The inlet opening 34 is again illustrated in the top left-hand corner of the figure. The ram air inlet channel 32, which is part of the ram air channel 30, is connected to the inlet opening 34. By contrast to the conventional construction from FIG. 1, in this arrangement according to the invention a bypass channel 20 branches off from a common inlet 25 of the ram air channel 30 and of the bypass channel 20, bypasses the air-conditioning system 10 and merges into the ram air outlet channel 40. The bypass channel comprises a non-return valve 22.

The bypass channel 20 is fed by the cool air from the ram air inlet channel 32. The air entering the ram air outlet channel 40 from the air-conditioning system 10 is sometimes very hot and must be cooled. In this instance this is achieved by the bypass channel 20 merging into the ram air outlet channel 40. The cool air from the bypass channel 20 is thus fed into the ram air outlet channel 40 and mixes with the hot air from the air-conditioning system 10. The air in the ram air outlet channel which is released into the outside environment is thus cooled. Damage to sensitive CFRP components caused by excessively hot air exiting from the ram air outlet channel 40 can thus be prevented.

Figure 3A:
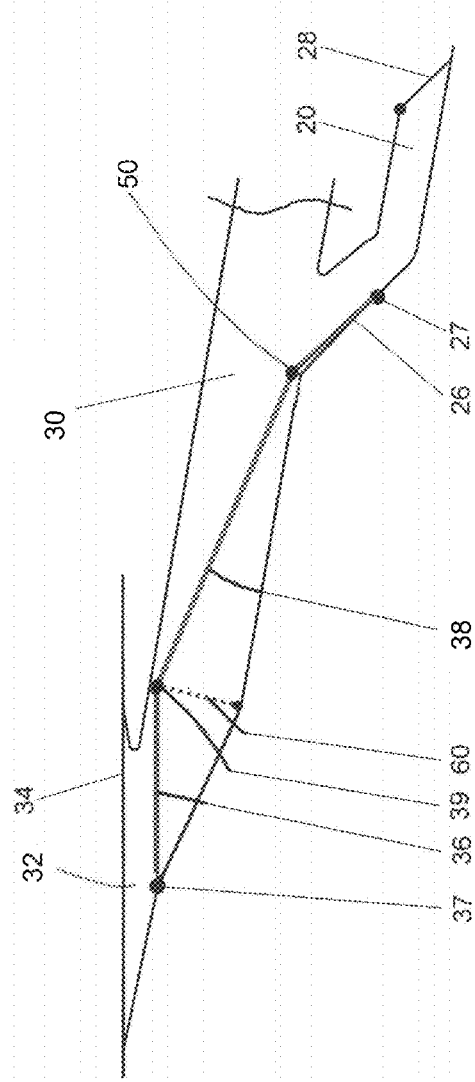
FIGS. 3a-3c are schematic cross-sectional views of the flaps in the ram air inlet channel and bypass channel from the embodiment of FIG. 2.
Figure 3B:
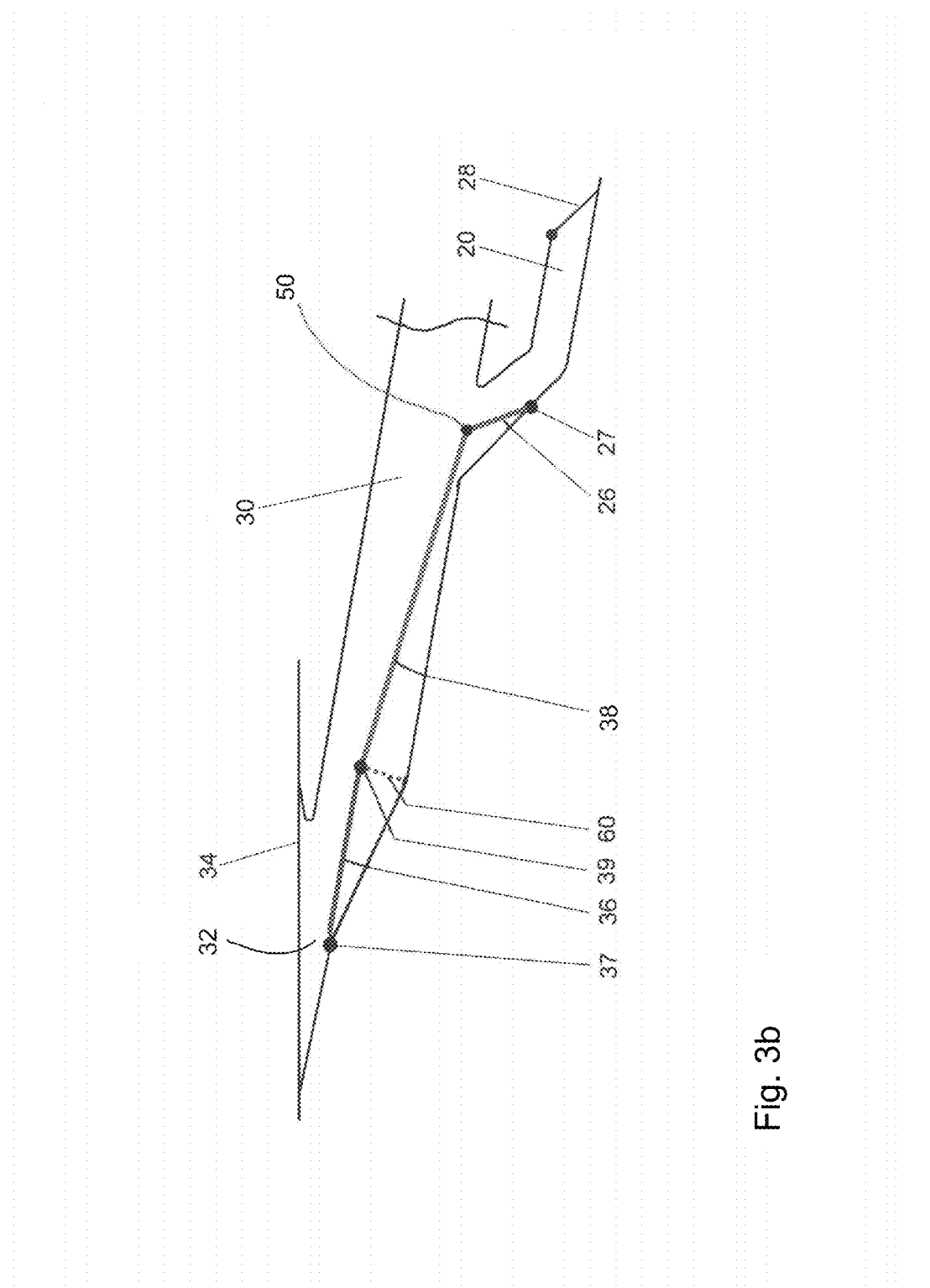
Figure 3C:
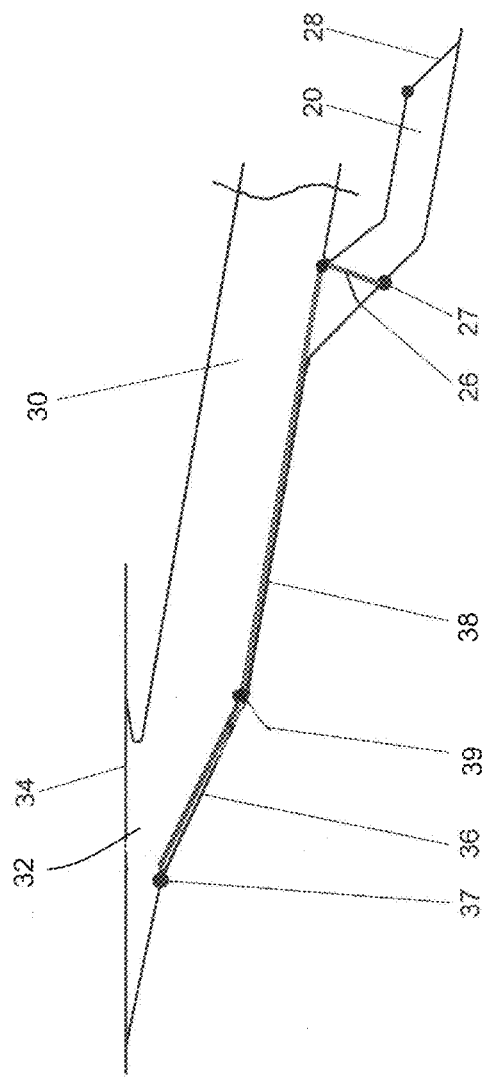

FIGS. 3a-3c show a schematic cross-sectional views of the flaps in the ram air inlet channel 32 and bypass channel 20 according to the embodiment from FIG. 2. The inlet opening34, ram air channel 30 and bypass channel 20 components are arranged in accordance with FIG. 2. A first flap 36 is arranged pivotally about a pivot axis 37 and a second flap 38 is arranged pivotally about a pivot axis 39 so as to close and open the inlet opening 34 of the ram air inlet channel 32. The bypass channel inlet flap 26, which opens and closes the bypass channel 20, is connected to the second flap 38 via a rod assembly 50 at a distance from a pivot axis 27 of the bypass channel inlet flap 26. A tension-compression means 60 pivots the first flap 36 and displaces the pivot axis 39 of the second flap 38.

As shown in FIG. 3a, in order to close the inlet opening 34 of the ram air inlet channel 32, the tension-compression means 60 moves the pivot axis 39 of the second flap 38 upwards and pivots the first flap 36 upwards in such a way that the first flap 36 is shifted in front of the inlet opening 34. Intermediate positions (FIG. 3b) are also provided in addition to a completely open position (FIG. 3c) and a closed position (FIG. 3a) of the first flap 36. By shifting the second flap 38 on the pivot axis 39 upwardly, this axis is shifted as a whole in such a way that it opens the bypass channel inlet flap 26 fixed to it by pivoting said bypass channel inlet flap about its pivot axis 27. If the first flap 36 is closed, the bypass channel inlet flap 26 of the bypass channel 20 is thus opened.

Although the present invention has been described by means of specific embodiments, it is not limited to these embodiments and may instead be modified in multiple ways. In particular, all conceivable combinations of the above embodiments are also possible.

The invention claimed is:

1. A device for exhaust air cooling of aircraft air-conditioning systems comprising:
a ram air channel with a ram air inlet channel and a ram air outlet channel; an aircraft air-conditioning system, wherein the aircraft air-conditioning system is arranged in the ram air channel between the ram air inlet channel and the ram air outlet channel; and
a bypass channel that bypasses the aircraft air-conditioning system and merges into the ram air outlet channel before a discharge opening for exhaust air, wherein the single ram air inlet channel supplies both the ram air channel and the bypass channel, wherein the bypass channel branches off from the ram air channel, bypasses the air-conditioning system and merges into the ram air outlet channel,
wherein a first flap is adjustably arranged at an inlet opening of the ram air inlet channel portion in such a way that an inlet cross-section of the inlet opening of the ram air inlet channel portion can be varied in size by the adjustable flap in order to adjust the volume of incoming air and wherein a second flap for adjusting the volume of incoming air is fixed to the first flap in an articulated manner in such a way that when the first flap is deflected, a pivot axis of the second flap is moved substantially towards or away from the pivot axis of the first flap and wherein a bypass channel inlet flap is kinematically coupled to the first adjustable flap and to the second adjustable flap.

2. The device for exhaust air cooling of aircraft air-conditioning systems according to claim 1, wherein the first flap is pivotal about its pivot axis substantially in the vertical direction by a tension-compression means fixed to said flap in an articulated manner.

3. The device for exhaust air cooling of aircraft air-conditioning systems according to claim 1, wherein the ram air outlet channel comprises a ram air channel outlet flap that generates a vacuum in the ram air outlet channel when open with a flow of external air.

4. The device for exhaust air cooling of aircraft air-conditioning systems according to claim 1, wherein a non-return valve is arranged in the bypass channel.

5. The device for exhaust air cooling of aircraft air-conditioning systems according to claim 1, wherein the bypass channel comprises an adjustable bypass channel inlet flap for adjusting the volume of air flowing into the bypass channel.

6. The device for exhaust air cooling of aircraft air-conditioning systems according to claim 5, wherein the bypass channel inlet flap is coupled to the second flap via a rod assembly.

7. The device for exhaust air cooling of aircraft air-conditioning systems according to claim 5, wherein the bypass channel inlet flap is coupled to the pivot axis of the second flap in an articulated manner in such a way that the second flap pivots about a pivot axis so as to open the bypass channel when the pivot axis of the second flap is moved upwards and vice versa.

* * * * *